(No Model.) 2 Sheets—Sheet 2.

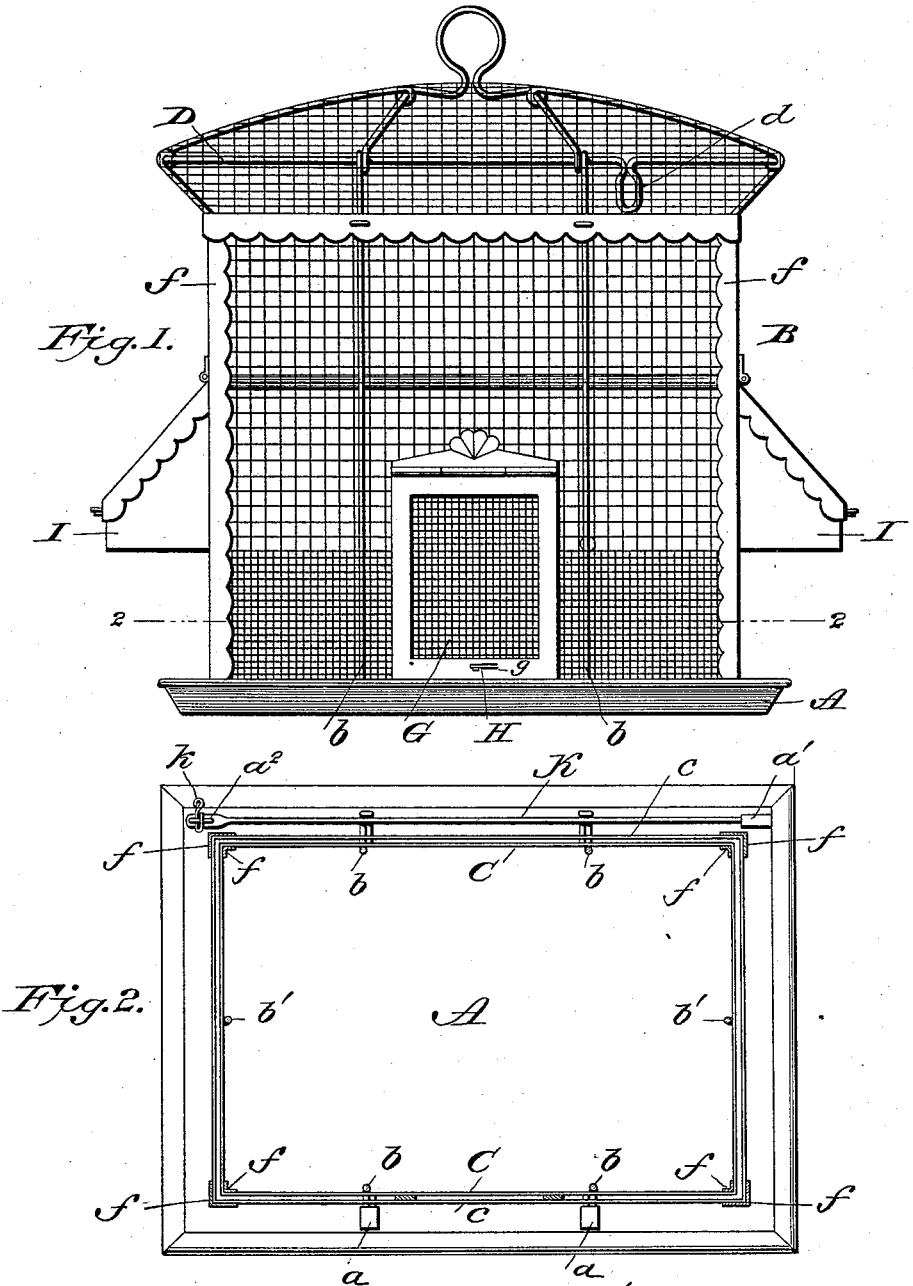

C. L. JOHNSON.
BIRD CAGE.

No. 571,165. Patented Nov. 10, 1896.

WITNESSES
G. S. Elliott.
T. W. Johnson.

Carrie L. Johnson
INVENTOR
by
Attorney

UNITED STATES PATENT OFFICE.

CARRIE L. JOHNSON, OF GLENDALE, NEW YORK.

BIRD-CAGE.

SPECIFICATION forming part of Letters Patent No. 571,165, dated November 10, 1896.

Application filed April 23, 1896. Serial No. 588,811. (No model.)

*To all whom it may concern:*

Be it known that I, CARRIE L. JOHNSON, a citizen of the United States of America, residing at Glendale, in the county of Lewis and State of New York, have invented certain new and useful Improvements in Bird-Cages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The primary object of my invention is to provide a bird-cage which will prevent cats or other animals reaching into the same or disengaging the fastening devices thereof.

A further object of the invention is to provide a bird-cage with a shield or screen at the lower part of the same which will prevent seed or litter finding its way out of the cage; also to so construct the frame of the cage that it will not be liable to get out of shape.

With the above ends in view, my invention consists in constructing the cage of a rigid wire frame, which is covered by a wire fabric; also in the construction of the fastening devices, all as will be hereinafter fully set forth, and particularly pointed out in the claims.

Figure 3:
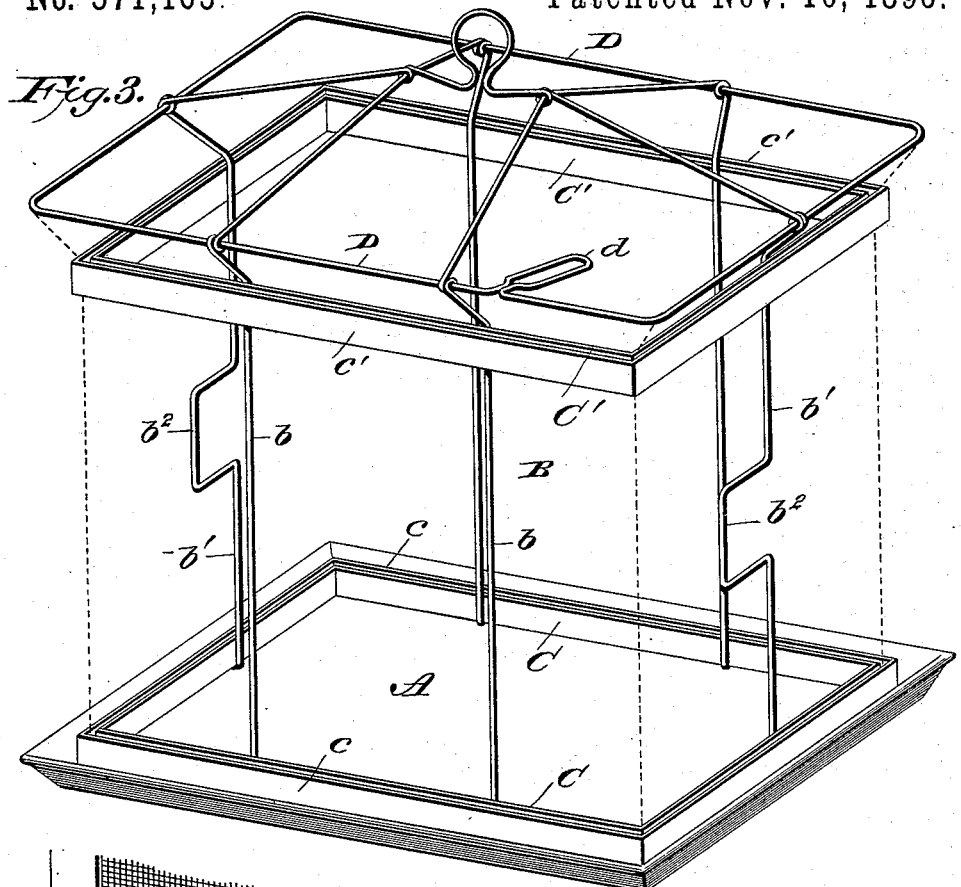
Figure 4:
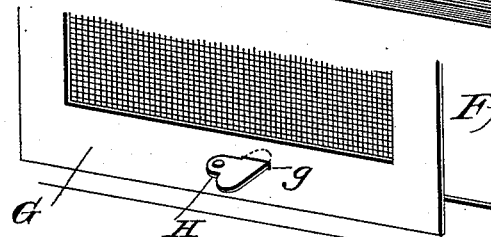
Figure 6:
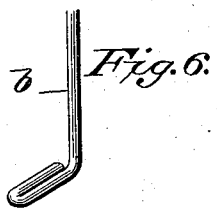
Figure 5:
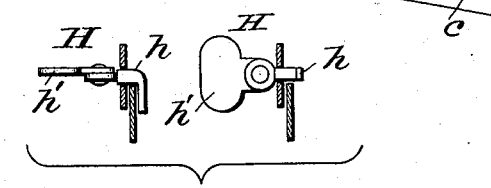
Figure 7:
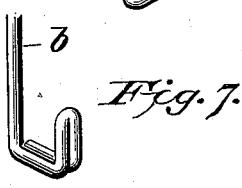

In the accompanying drawings, forming part of this specification, Figure 1 is a front elevation of a bird-cage constructed in accordance with my invention. Fig. 2 is a horizontal sectional view on the line 2 2 of Fig. 1. Fig. 3 is a perspective view of the frame of the cage. Fig. 4 is a view showing the lower part of the door with the latch in engagement therewith. Fig. 5 shows detail views of the latch, and Figs. 6 and 7 are detail views of the lower ends of two of the wires which make up the frame.

A designates the pan or bottom of the cage, which is preferably made up of sheet metal, with upturned edges, and is provided near its forward edge with loops $a\ a$, suitably attached thereto. The rear part of the pan A is provided at one end with a loop $a'$ and at the opposite end with a staple $a^2$. The loop and staple are for the purpose of holding the bottom or pan A in engagement with the frame of the cage, as hereinafter described.

B designates the frame, which is made up of several pieces of wire, bent and connected to each other by rectangular sections to present a skeleton or framework, which, when covered by the wire fabric, will form a cage of ornamental appearance and durable. The lower ends of the front section of the wires $b\ b$ of the frame B are given a double bend, as shown in Fig. 6, and are rigidly secured to a lower rectangular frame C, from which they extend upwardly to a rectangular frame $C'$, are then bent outwardly at an inclination and are twisted about a rectangular wire frame D, from which they extend across at opposite inclinations and are connected to the opposite sides of the rectangular frames D, $C'$, and C in a similar manner, the rear ends of said wires being bent, as shown in the detail view, Fig. 7. The wire $b'$, which forms the ends of the frame B, is attached at its ends to the rectangular frame C and is also connected to the frames $C'$ and D, the part that extends across the frame D being twisted around the wires $b$ and formed into a loop or handle between said wires. The vertical portions of the wire $b'$ are formed into open loops $b^2$, to the horizontal portions of which the seed-receptacles are attached.

The wire which forms the rectangular frame D is bent to provide an inwardly-projecting loop $d$, which forms a holder for cuttle-fish, and the vertical portions of the wires $b$ provide means for supporting the perches, said perches acting to brace the frame.

The frame B, hereinbefore described, is extremely light and rigid and is covered by a reticulated or wire fabric, which is woven so as to provide at the upper part of the cage meshes of considerable size, while at the lower part of the cage the meshes are reduced about one-fourth to prevent seed and litter passing through the same. This construction will also strengthen the lower part of the cage, which is liable to the greatest wear and tear, and will dispense with the use of shields or screens. When the wire fabric is attached to the frame B, metal bands $c$ and $c'$ are bent around the cage and secured to the frames C and C' to hold said fabric securely in place. The fabric is also reinforced at the corners of the cage by metal strips $f$.

A doorway is cut in the front of the cage and the wire fabric adjoining this doorway is reinforced by metal strips, to the upper strip being hinged a door G, consisting of a metal frame having a panel of wire fabric, the meshes of which correspond with the meshes at the lower part of the cage. The door G is fastened when closed by a latch H, Fig. 5, which consists of a bolt $h$, which passes through the lower metal strip of the door and is provided with an inner bent end that engages the strip at the lower end of the doorway. The outer end of the bolt $h$ is flattened and has pivoted thereto a plate $h'$, which is adapted to be turned to engage a slot $g$ in the door and thereby prevent the turning of the bolt. By swinging the plate upon its pivot the bolt can be turned to disengage the lower strip of the doorway. A similar latch is placed upon the covers of the seed-boxes I.

The bottom A is connected to the body of the cage by causing the forward ends of the wires $b$ to engage the loops $a$, the rear end of said bottom being held in place by a rod K, one end of which engages the loop $a'$, while the other end is formed into an eye which is passed over the staple $a^2$ and is held in engagement therewith by means of a hook $k$, the rod engaging the rear ends of the wires $b$. This manner of connecting the bottom to the cage prevents any liability of said bottom becoming disconnected.

A cage constructed as hereinbefore described is light and ornamental in appearance, and can be cheaply manufactured.

I am aware that prior to my invention it has been proposed to employ a reticulated fabric in the construction of bird-cages, and I do not therefore claim such construction broadly; but What I do claim as new, and desire to secure by Letters Patent, is—

1. The combination in a bird-cage, of the frame B consisting of the wires $b$ $b$ and $b'$ bent as shown to present vertical members and upper transverse members which are inclined outward and then upward, the wire $b'$ being formed into a loop or handle and the terminals of all the wires bent outward; rectangular frames D C and C' connecting the wires to each other; a wire fabric placed over the frame so constructed, and metallic bands $c$ and $c'$ for holding the fabric upon the frame; together with the bottom or pan A, and means carried thereby to engage the outwardly-bent ends of the wires $b$ $b$ and $b'$, substantially as shown and described.

2. The combination in a bird-cage, of a frame which is adapted to be covered by a wire fabric, said frame consisting of frames C C' and D and wires $b$ and $b'$ connected thereto, the ends of the wires $b$ and $b'$ being bent outwardly, as shown; together with a bottom or pan A having loops $a$ $a$ $a'$ and staple $a^2$, a rod K which engages at one end with the loop $a'$ and is formed into an eye at its other end to engage the staple $a^2$, and a hook for holding the rod in engagement with the staple, for the purpose set forth.

3. A fastening for bird-cages consisting of a bent bolt $h$ passed through an opening in the door, said door being provided adjacent thereto with a slot, and a plate pivoted to the outer end of the bolt so as to engage the slot, substantially as shown and for the purpose set forth.

In testimony whereof I affix my signature in presence of two witnesses.

CARRIE L. JOHNSON.

Witnesses:
 ADDIS F. JOHNSON,
 EGBERT ROOT.